No. 883,652. PATENTED MAR. 31, 1908.
O. LENSCHOW & C. MATHIESON.
COOKING VESSEL.
APPLICATION FILED SEPT. 18, 1907.
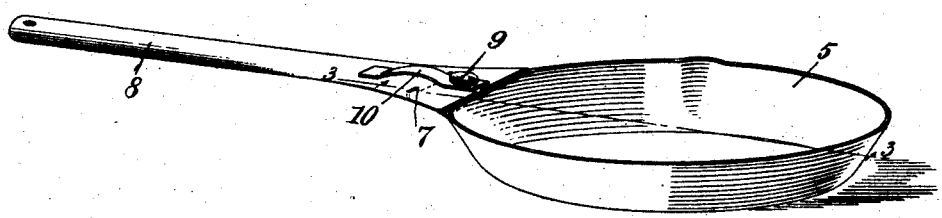
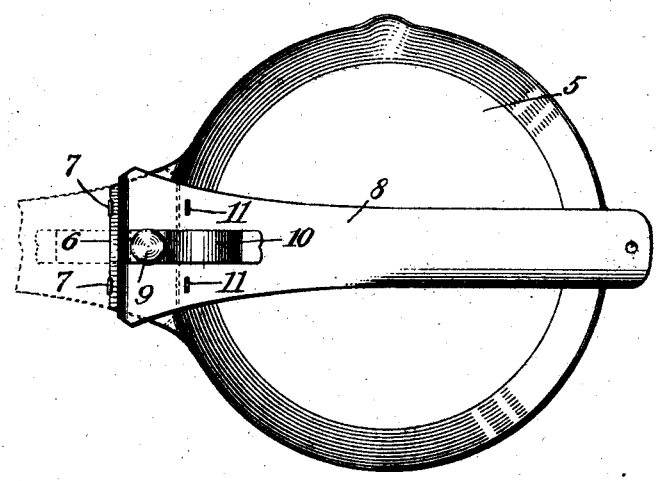
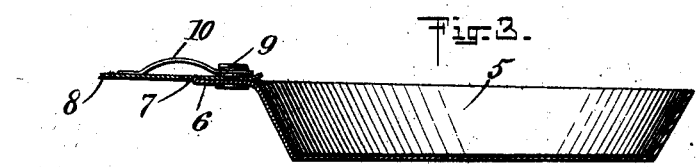
WITNESSES
INVENTORS
Olaf Lenschow
Christian Mathieson
BY
ATTORNEYS

UNITED STATES PATENT OFFICE.

OLAF LENSCHOW AND CHRISTIAN MATHIESON, OF BUTTE, MONTANA.

COOKING VESSEL.

No. 883,652.

Specification of Letters Patent.     Patented March 31, 1908.

Application filed September 18, 1907. Serial No. 393,457.

*To all whom it may concern:*

Be it known that we, OLAF LENSCHOW and CHRISTIAN MATHIESON, citizens of the United States, and residents of Butte, in the county of Silverbow and State of Montana, have invented new and useful Improvements in Cooking Vessels, of which the following is a full, clear, and exact description.

This invention relates to improvements in cooking vessels, principally frying pans, and has for its object to provide in a device of this nature a handle which may be swung across the pan when the said pan is not in use, and which will automatically lock in place when turned to an extended or operative position. This construction admits of the pan being packed within a small space, making it particularly desirable for campers, prospectors, etc.

Reference is to be had to the accompanying drawings forming a part of this specification, in which similar characters of reference indicate corresponding parts in all the views.

Figure 1 is a perspective view of a frying pan embodying our improvement, showing the handle of the pan in an extended or operative position; Fig. 2 is a plan of the pan with the handle turned over the top thereof as when it is packed for moving; and Fig. 3 is a vertical sectional view substantially centrally taken through the pan and handle.

The character of cooking vessel in connection with which I have shown my improvement applied is an ordinary frying pan 5, which is provided with an integral stub 6 extended outwardly from the top edge of the pan, and is constructed with projections 7 by turning up the metal at its outer edge.

Pivoted to the stub 6 is a handle 8 of any suitable outer form, with the inner end thereof flattened and of extended width to provide a firm bearing on the stub 6. The pivotal connection between the stub 6 and handle 8 is effected by a pin or pivot 9, which also passes through one end of a curved or bowed spring 10. The opposite end of said spring presses directly on the top face of the handle, and thus firmly forces the said handle at all times against the stub 6. At each side of the spring 10 apertures 11 are formed in the handle 8, of such form and relative position as to register with the projections 7 and engage therewith when the handle is turned outwardly in an extended or operative position.

The end of the handle adjacent to the pivot 9 is curved or turned outwardly slightly as best shown in Fig. 3; this construction admitting of the handle riding over the projections 7 when it is swung from the position shown in Fig. 2 to that shown in Fig. 3. In this last-named position as the apertures 11 register with the projections 7, the spring 10 operates to engage them and thus securely and automatically lock the handle in an extended and operative position. To disengage the handle from the projections 7 when desired to turn it across the pan, it is only necessary to raise the handle upwardly a slight distance against the tension of the spring, when the handle may be swung freely on its pivot. When the handle is moved across the pan, the spring 10 will operate to bind its outer end against the top edge of the vessel and thus prevent any swinging or rattling of the handle when thus disposed.

The invention as illustrated and described while being the preferred form of our improvement may nevertheless be modified within the scope of the claims annexed.

Having thus described our invention, we claim as new and desire to secure by Letters Patent:

1. A pan having a handle pivoted thereto, whereby it is adapted to be turned across the pan, and means operating to automatically lock the handle to the pan when the handle is turned to operative position, including means to bindingly engage the outer end of the handle against the top edge of the pan when the said handle is turned across the pan.

2. A pan having a stub projecting outwardly from its upper edge provided with projections, a handle pivoted to bear flat against the stub having a turned-up inner end adapting it to override said projections when the handle is revolved, said handle having apertures, and a spring carried by the pivot of the handle operating to force it in firm contact with the stub and automatically engage the projections with said apertures when in register.

3. A pan having a handle pivoted to swing laterally thereover, a spring carried by the pivot of the handle operating to press the handle to the pan, and means locking the handle in an extended position arranged at both sides of the spring.

4. A cooking vessel having a handle pivoted thereto to swing laterally thereacross, and a spring made as a separate part and carried by the pivot of the handle for pressing the handle into firm engagement with the vessel.

5. A cooking vessel having a handle pivoted thereto adapted to swing laterally over the top of the vessel, and a bowed spring secured by the pivot of the handle operating to press the handle to the vessel.

6. A vessel having a handle pivoted thereto adapted to be swung laterally thereacross, means for locking the handle when turned to an extended or operative position, and a spring separate from the handle for automatically engaging the handle with said means when extended, and for forcing the handle against the top edge of the vessel when swung thereover.

In testimony whereof we have signed our names to this specification in the presence of two subscribing witnesses.

OLAF LENSCHOW.
CHRISTIAN MATHIESON.

Witnesses:
R. JENNINGS,
D. G. KELLY.